United States Patent [19]

Beier

[11] 4,018,098

[45] Apr. 19, 1977

[54] EXHAUST GAS RETURN VALVE ACTUATING ROD

[75] Inventor: Alfred Beier, Hondelage, Germany

[73] Assignee: Volkswagenwerk Aktiengesellschaft, Germany

[22] Filed: Mar. 4, 1976

[21] Appl. No.: 663,691

[30] Foreign Application Priority Data

Apr. 12, 1975 Germany .......................... 2516112

[52] U.S. Cl. .................................... 74/470; 74/582; 403/109; 403/166; 403/393

[51] Int. Cl.$^2$ ........................ G05G 1/00; F16B 7/10

[58] Field of Search ............. 74/470, 582; 403/104, 403/109, 166, 393

[56] References Cited

UNITED STATES PATENTS

| | | | |
|---|---|---|---|
| 686,218 | 11/1901 | Forst | 403/104 X |
| 1,909,949 | 5/1933 | Hammonds | 160/329 X |
| 2,090,246 | 8/1937 | Alexander | 74/470 X |
| 2,094,732 | 10/1937 | Anderson | 403/393 X |
| 3,254,414 | 6/1966 | Puthuff | 403/104 X |
| 3,308,678 | 3/1967 | Walker | 74/470 X |

*Primary Examiner*—Allan D. Herrmann
*Attorney, Agent, or Firm*—Brumbaugh, Graves, Donohue & Raymond

[57] ABSTRACT

An actuating rod for interconnecting a throttle with an exhaust gas return valve has first and second rod portions which are interconnected in force transmitting relation by a spring. The second rod portion is bent to extend parallel to the first rod portion over part of its length and has a loop surrounding the first portion and engaging the spring.

7 Claims, 1 Drawing Figure

EXHAUST GAS RETURN VALVE ACTUATING ROD

BACKGROUND OF THE INVENTION

This invention relates to exhaust gas return valves and in particular to actuating rods for interconnecting such a return valve with a throttle.

U.S. Pat. application Ser. No. 544,220, filed Jan. 27, 1975 now U.S. Pat. No. 3,989,018 by the present inventor, the disclosure of which is incorporated herein by reference, shows an exhaust gas control valve which is interconnected with a throttle by means of an actuating rod. Such an exhaust gas return valve is useful in motor vehicles for reducing nitrous oxide emissions. When a portion of the exhaust gas is returned to the intake manifold of an internal combustion engine the inert characteristics of the exhaust gas tend to reduce the peak combustion temperatures in the engine. This reduced combustion temperature results in a lower level of undesired nitrous oxide emissions.

As indicated in the prior patent application, it is desired that the portion of exhaust gases supplied to the intake manifold be varied in accordance with the throttle setting. The exhaust gas return valve has a closed position when the engine is idling, opens as the throttle is advanced and then closes again at full throttle against a stop. In order to permit full throttle actuation after the exhaust gas valve reaches its stop position, it is necessary to provide for resilient expansion of the actuating rod interconnecting the throttle with the exhaust gas valve. Resilient connection is also desirable in the event that the exhaust gas return valve becomes jammed on account of icing or contamination from exhaust gas deposits. By providng a resilient spring in the force transmitting direction of the actuating rod, it is possible to operate the throttle of the engine while the valve is jammed in a closed position.

The prior patent application discloses an actuating rod which provides resilient interconnection of the exhaust gas control valve and the throttle. The rod therein disclosed includes first and second rod portions which are in force transmitting interconnection by use of a spring. The first rod portion has a tubular section which is arranged coaxially around the second rod portion. The spring is arranged surrounding the tubular section. There is additionally provided an adusting nut, functioning as a turnbuckle which is useful for adjusting the length of the actuating rod and therfore the setting of the exhaust gas control valve.

While the actuating rod disclosed in the prior application is fully functional for its intended purpose, it is rather expensive to manufacture in large quantities for use on automobiles.

OBJECTS OF THE INVENTION

It is therefore an object of the present invention to provide an improved actuating rod for interconnecting a throttle and an exhaust gas control valve.

It is a further object of the invention to provide such an actuating rod which is easily manufactured at low cost.

It is a still further object of the invention to provide such an actuating rod with an adjuctable length.

In accordance with the present invention there is provided an actuating rod for interconnecting a throttle and an exhaust gas control valve. The rod includes first and second rod portions. The second rod portion has a first section which is axially aligned with the first rod portion and a second section having an axis essentially parallel to the first rod portion; the end of the second section has a loop surrounding the first rod portion. A spring is provided concentrically surrounding the first rod portion and acting upon the loop.

In a preferred embodiment of the present invention, the spring is arranged between the loop of the second rod portion and a retaining ring on the first rod portion. A second loop surrounding the first rod portion may be formed in the second rod portion. The second loop surrounds the first rod portion adjacent to the retaining ring and on the side of the retaining ring away from the spring. The first and second loops may be conveniently formed by bending the second rod portion to form a loop in a plane perpendicular to the axis of the second rod portion. The first loop may be provided with a tubular guide sleeve concentric to the first rod portion for guiding the spring. There may also be provided an adjustable stop for the first loop on the first rod portion, which may be formed by using a nut adjustable along a threaded section of the first rod portion.

For a better understanding of the present invention together with other and further objects thereof, reference is had to the following description, taken in conjunction with the accompanying drawing, and its scope will be pointed out in the appended claims.

DESCRIPTION OF THE INVENTION

Figure 1:
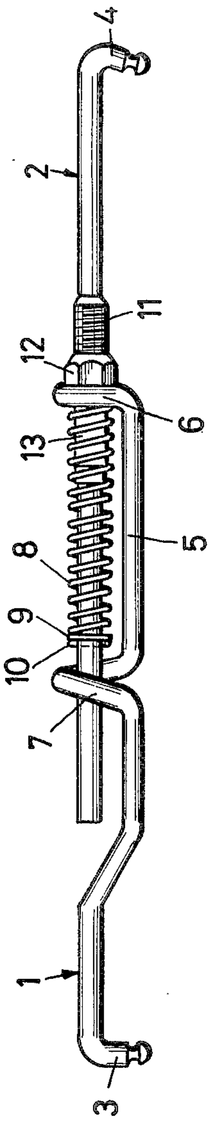
FIG. 1 shows an actuating rod in accordance with the present invention.

The actuating rod shown in FIG. 1 includes a first rod portion 2 and a second rod portion 1 which are interconnected by spring 8 to provide acutating interconnection between an exhaust gas control valve and a throttle. The actuating rod may be connected to the throttle or throttle linkage at either end 3 or 4, while the remaining end is connected to an exhaust gas control valve. The second rod portion 1 is bent so that over a section 5 of its length is extends parallel to the first rod portion 2. The remaining section of rod portion 1 is axially aligned with the first rod portion 2.

Section 5 of rod portion 1 is provided with first loop 6 which surrounds first rod portion 2. First loop 6 engages spring 8 to provide a force transmitting connection between rod portion 1 and rod portion 2. To provide for improved guidance of axial motion between rod portions 1 and 2 there is provided a second loop 7 in section 5 of rod portion 1 which surrounds rod portion 2 adjacent to retaining ring 9, and on the side of retaining ring 9 opposite spring 8.

Spring 8 is retained on first rod portion 2 by retaining ring 9 which is held in position by pin 10 which is inserted through rod portion 2. The opposite end of spring 8 engages loop 6. On loop 6 there is provided a guide sleeve 13 which is slideably mounted coaxial with first rod portion 2. An adjustment of the length of the actuating rod is provided by nut 12 which is arranged on a threaded surface 11 on rod portion 2. The operation of the invention will be easily understood by those skilled in the art. The actuating rod of FIG. 1 may be connected between a throttle valve and an exhaust gas control valve as shown in the prior patent application. Under normal operating conditions nut 12, which forms a stop for the motion of rod portion 1 under the force of spring 8 may be adjusted to provide for the proper length between the exhaust gas return valve lever and the throttle linkage lever when the throttle is at idling position. The length should be set so that with the throttle at idle, the exhaust gas return valve is fully closed. When the throttle setting is increased, motion of the throttle linkage causes tension to be applied to the actuating rod. Under normal conditions the tension is transmitted by the force of spring 8 between the first and second rod portions and is applied to cause opening of the exhaust gas return valve at intermediate settings of the throttle and closing of the valve at its end stop position at full throttle setting.

In the event the exhaust gas return valve becomes frozen or otherwise jammed in a closed position, or the valve reaches its fully closed stop position prior to full throttle opening, additional motion of the throttle will not be inhibited. In either event rod portion 1 may be moved against spring 8 while rod portion 2 remains stationary on account of the jammed or fully closed exhaust gas return valve. Spring 8 is selected to provide sufficient tension to open the exhaust gas return valve under normal conditions, but will not exert sufficient force to significantly resist further advancement of the throttle when the control valve is jammed or in its stop position.

Those skilled in the art will recognize that the connecting ends 3 and 4 of the actuating rod ae interchangeable and that rod portion 1 may be connected to the throttle valve or the exhaust gas return valve while rod portion 2 is connected to the other with equal effectiveness. It will also be recognized that the actuating rod in accordance with the present invention is simpler and more economically fabricated than the rather complex interconnecting rod described in the prior application. The rod is easily fabricated by bending the first and second portions into the configuration shown and providing the small number of additional parts illustrated.

Where there has been described what is believed to be the preferred embodiment of the invention, those skilled in the art will recognize that other and further modifications may be had thereto, as it is intended to claim all such modifications as fall within the true scope of the invention.

I claim:

1. An actuating rod for interconnecting a throttle with an exhaust gas return valve, comprising;

a first rod portion;

a second rod portion, having a first section axially aligned with said first rod portion, and a second section having an axis essentially parallel to said first rod portion, the end of said second section having a first loop surrounding said first rod portion;

and a spring concentrically surrounding said first rod portion and acting upon said first loop.

2. An actuating rod as specified in claim 1 wherein said spring is arranged between said first loop and a retaining ring fixed to said first rod portion.

3. An actuating rod as specified in claim 2 wherein said second rod portion has a second loop surrounding said first rod portion adjacent said retaining ring on the side of said ring away from said spring.

4. An actuating rod as specified in claim 3 wherein each of said loops is formed by bending said second rod portion to form said loop in a plane perpendicular to said axis.

5. An actuating rod as specified in claim 1 wherein said first loop is provided with a tubular guide sleeve concentric to said first rod portion for guiding said spring.

6. An actuating rod as specified in claim 1 wherein there is provided a stop for said first loop, adjustably located on said first rod portion.

7. An actuating rod as specified in claim 6 wherein said stop comprises a nut adjustable along a threaded surface on said first rod portion.

* * * * *